United States Patent
Baker

(10) Patent No.: US 6,269,934 B2
(45) Date of Patent: *Aug. 7, 2001

(54) LOAD-CARRYING CONNECTING BAR ASSEMBLY FOR A CONVEYOR

(76) Inventor: James D. Baker, 2725 S. Hampton, Martinsville, IN (US) 46151

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,017

(22) PCT Filed: Jan. 23, 1998

(86) PCT No.: PCT/US98/01345

§ 371 Date: Sep. 17, 1999

§ 102(e) Date: Sep. 17, 1999

(87) PCT Pub. No.: WO98/32680

PCT Pub. Date: Jul. 30, 1998

Related U.S. Application Data

(60) Provisional application No. 60/035,408, filed on Jan. 23, 1997.

(51) Int. Cl.[7] .................................................. B65G 29/00
(52) U.S. Cl. ................. 198/465.1; 198/685; 198/867.15
(58) Field of Search ........................... 198/867.15, 465.1, 198/678.1, 685, 860.1, 861.1; 104/172.1, 172.4, 174

(56) References Cited

U.S. PATENT DOCUMENTS

| | | |
|---|---|---|
| 1,570,819 | 1/1926 | Bart . |
| 2,757,781 * | 8/1956 | Freeman ............................ 198/685 X |
| 2,848,213 | 8/1958 | Bloom et al. . |
| 2,886,165 | 5/1959 | Eger . |
| 3,645,375 | 2/1972 | Gelzer . |
| 3,866,779 | 2/1975 | Dongelmans . |
| 4,467,911 * | 8/1984 | Forshee ........................... 198/867.15 |
| 4,501,351 * | 2/1985 | Tracy .............................. 198/867.15 |

OTHER PUBLICATIONS

Jervis B. Webb Company, "Inverted Power & Free Conveyors...", (1984) (5 pages with information on the front and back of every page.).

Richards*Wilcox, Inc., "OveR–Way Inverted Power & Free Conveyors", (Date Unknown) (1 page with information on the front and back of the page.).

* cited by examiner

Primary Examiner—James R. Bidwell
(74) Attorney, Agent, or Firm—Bose McKinney & Evans LLP

(57) ABSTRACT

A conveyor (12) is provided that includes a power mechanism housing (18), a power mechanism (16), a linkage (27), and a connecting bar (10). The power mechanism housing is formed to include a power slot (26). The power mechanism is positioned to lie in the power mechanism housing. The linkage includes a first end coupled to the power mechanism and a second end spaced apart from the first end. One of the linkage and power mechanism is positioned to extend through the power slot. The connecting bar is coupled to the second end of the linkage and configured to support a product at a position wherein the power mechanism is positioned to lie between the power slot formed in the power mechanism housing and the product.

26 Claims, 10 Drawing Sheets

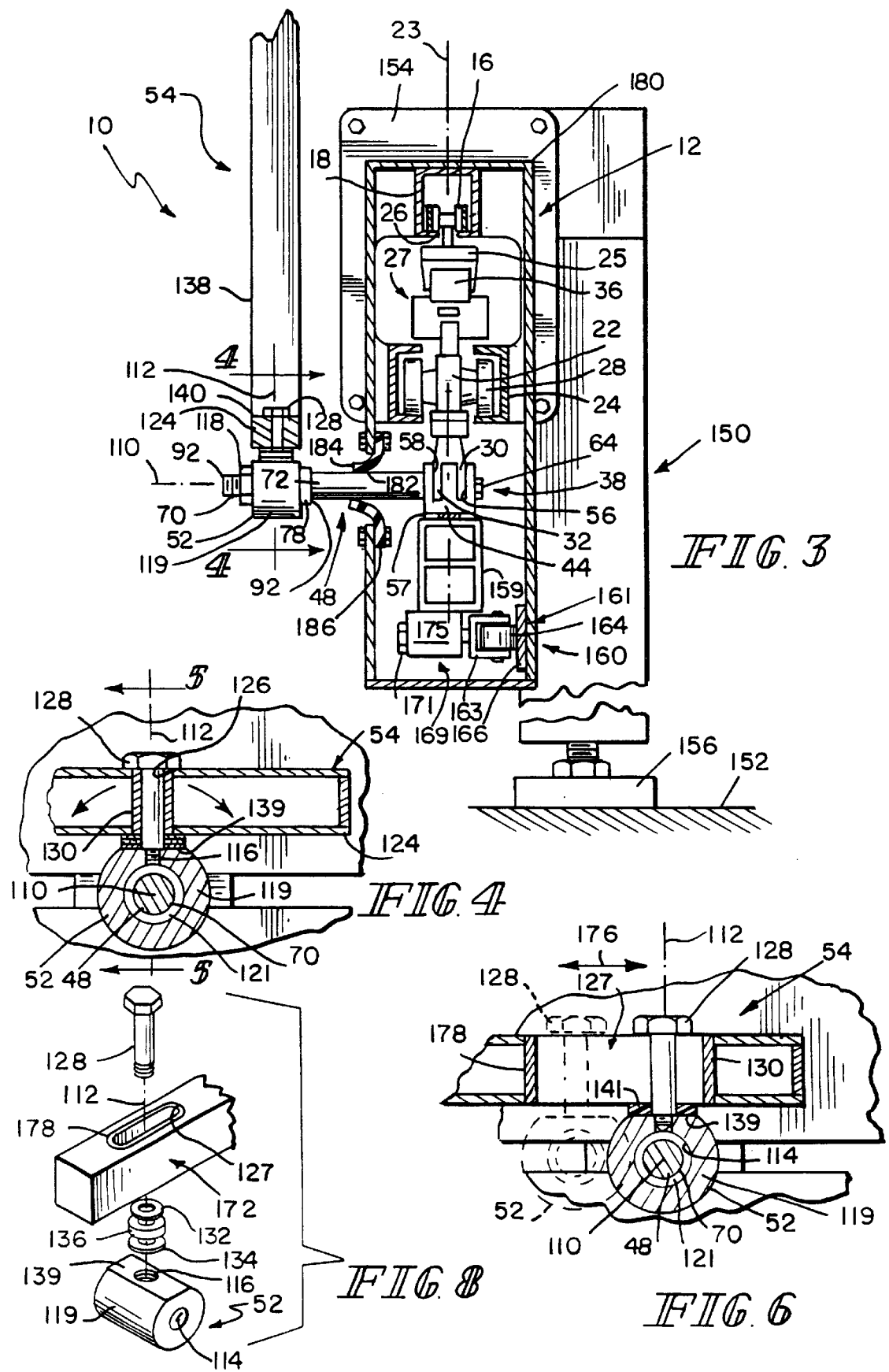

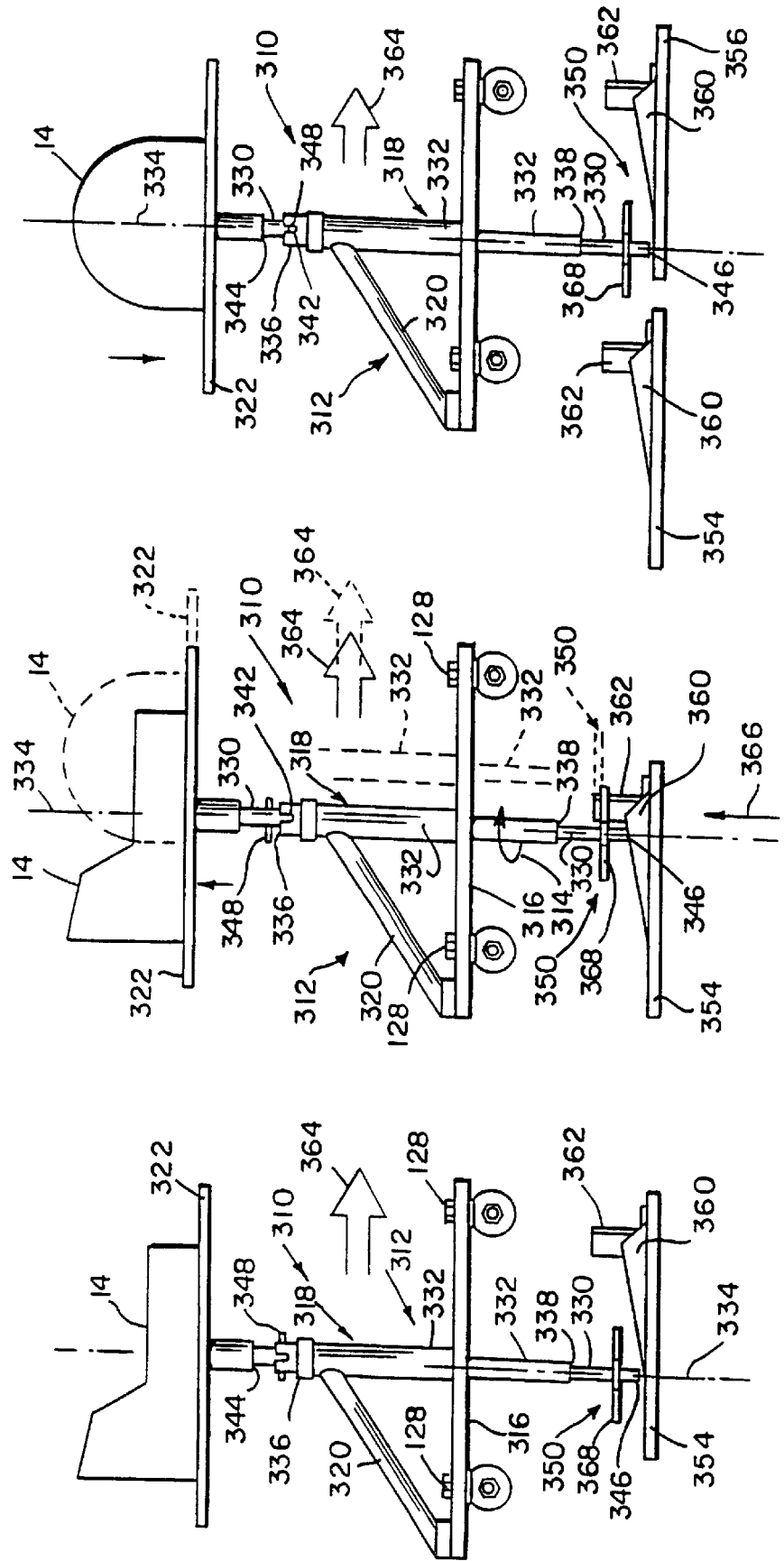

LOAD-CARRYING CONNECTING BAR ASSEMBLY FOR A CONVEYOR

CROSS-REFERENCES TO RELATED APPLICATIONS

This application is a U.S. national phase application of international application serial No. PCT/US98/01345 filed Jan. 23, 1998, which claims priority to U.S. provisional Ser. No. 60/035,408 filed Jan. 23, 1997.

BACKGROUND AND SUMMARY OF THE INVENTION

The present invention relates to conveyors. More particularly, the present invention relates to connecting bar assemblies for conveyors.

In general, conveyors support products through a fixture configured so that the products hang downwardly below the fixture and conveyor. The movable portions of the conveyor (conveyor chain, trolleys, etc.) are positioned to lie above the product which can lead to product contamination by oil, grease, dust, etc. dropping onto the product being conveyed.

Some conveyors support products through a fixture configured so that the products are positioned to lie vertically above the fixture and conveyor. However, these conveyors invert a conventional conveyor so that a power slot of the conveyor opens upwardly toward the product being conveyed. The upwardly-opening power slot permits various substances and items to be received into the conveyor which can cause the conveyor to be damaged. For example, when products are conveyed through a wash station, water can flood the conveyor chain and wash needed lubricating oil off of the conveyor chain; when products are being conveyed through a painting/coating station, paint and powder can enter the conveyor and build up on the conveyor chain; and at any time, foreign objects such as nuts and bolts can enter the conveyor and jam the conveyor track.

What is needed is a connecting bar assembly for use with a conveyor that connects to the conveyor through a downwardly-opening power slot and supports products being conveyed so that they are positioned to lie above the conveyor. Because the connecting bar supports the products being conveyed in this manner, substances cannot fall into the power slot to damage the conveyor and oil, grease, etc. from the conveyor cannot fall onto the product being conveyed.

According to the present invention, a conveyor is provided that includes a power mechanism housing, a power mechanism, a linkage, and a connecting bar. The power mechanism housing is formed to include a power slot. The power mechanism is positioned to lie in the power mechanism housing. The linkage includes a first end coupled to the power mechanism and a second end spaced apart from the first end. One of the linkage and power mechanism is positioned to extend through the power slot. The connecting bar is coupled to the second end of the linkage and configured to support a product at a position wherein the power mechanism is positioned to lie between the power slot formed in the power mechanism housing and the product.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 3 illustrates a fragmentary, partly sectional end elevational view of the assembly illustrated in FIG. 1, taken generally along section lines 3—3 of FIG. 1;

FIG. 4 illustrates a fragmentary, sectional view of the apparatus illustrated in FIG. 3, taken generally along section lines 4—4 of FIG. 3;

FIG. 6 illustrates a fragmentary, sectional view of the apparatus illustrated in FIG. 2 taken generally along line 6—6 of FIG. 2;

FIG. 8 illustrates an exploded perspective view of a portion of an alternative coupling between portions of the connecting bar assembly;

FIGS. 12–14 illustrate a series of side elevational views of the connecting bar assembly of FIG. 11 showing the connecting bar assembly being moved over a ramp so that the product being conveyed can be rotated to a desired position;

FIG. 12 illustrates a side elevational view of the connecting bar assembly of FIG. 11 showing the position of the product being conveyed before the connecting bar assembly engages the ramp;

FIG. 13 illustrates a side elevational view similar to FIG. 12 showing the rotation of the product being conveyed from a first position before the product is rotated (shown in solid lines) to a second position after the product is rotated (phantom lines);

FIG. 14 illustrates a side elevational view similar to FIGS. 12 and 13 showing the connecting bar assembly after it disengages the ramp.

DETAILED DESCRIPTION OF THE DRAWINGS

A load-carrying connecting bar assembly 10 according to the present invention is provided for use on a conventional conveyor 12 to support a product 14 being moved by conveyor 12. Conveyor 12 can be a power and free type conveyor or a continuous flow conveyor such as an Over-WaY™ conveyor produced by Richards-Wilcox of Aurora, Ill. Conveyors may be used to move products 14 through a manufacturing plant through various assembly stations, inspections stations, painting/coating stations, packaging/shipping stations, etc.

Figure 1:
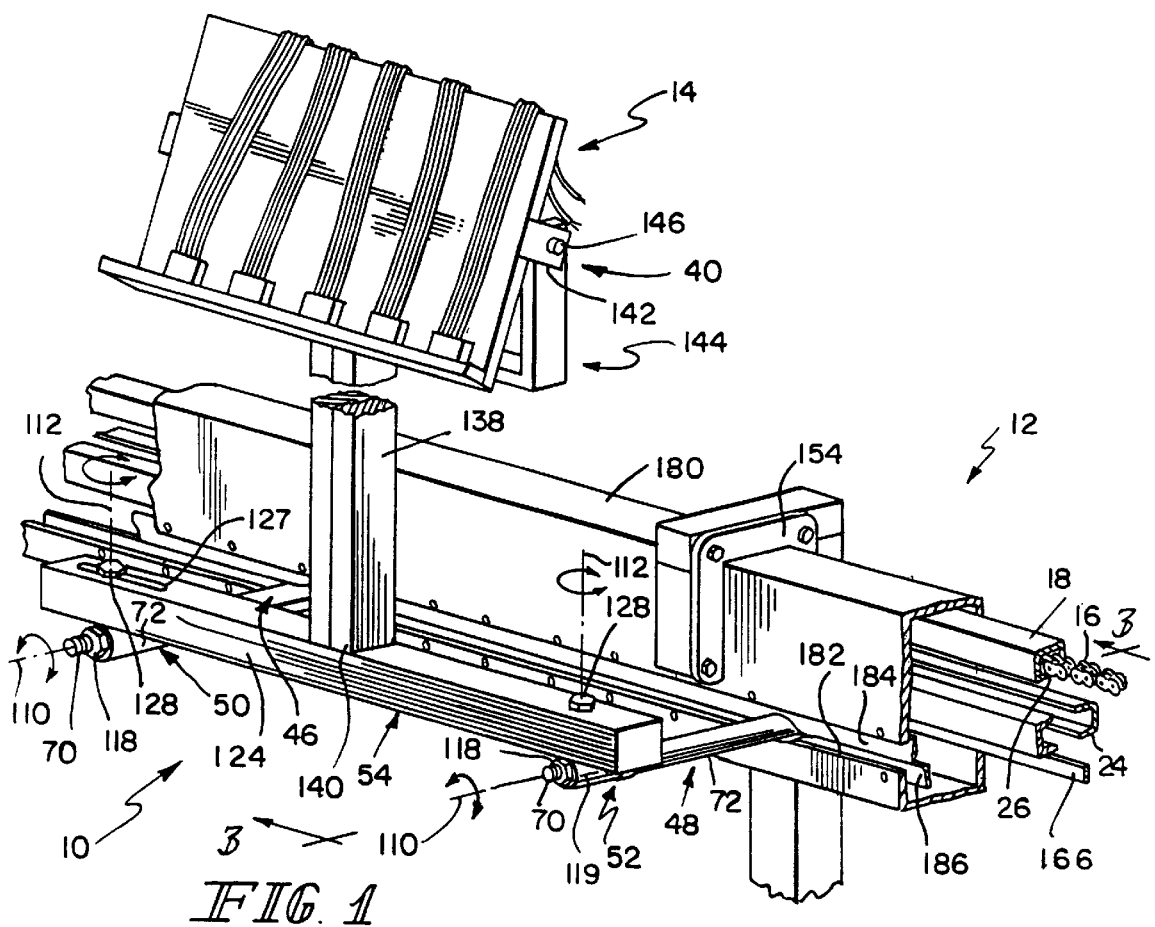
FIG. 1 illustrates a perspective view a portion of a conveyor and a connecting bar assembly supporting a product for movement by the conveyor.
Figure 2:
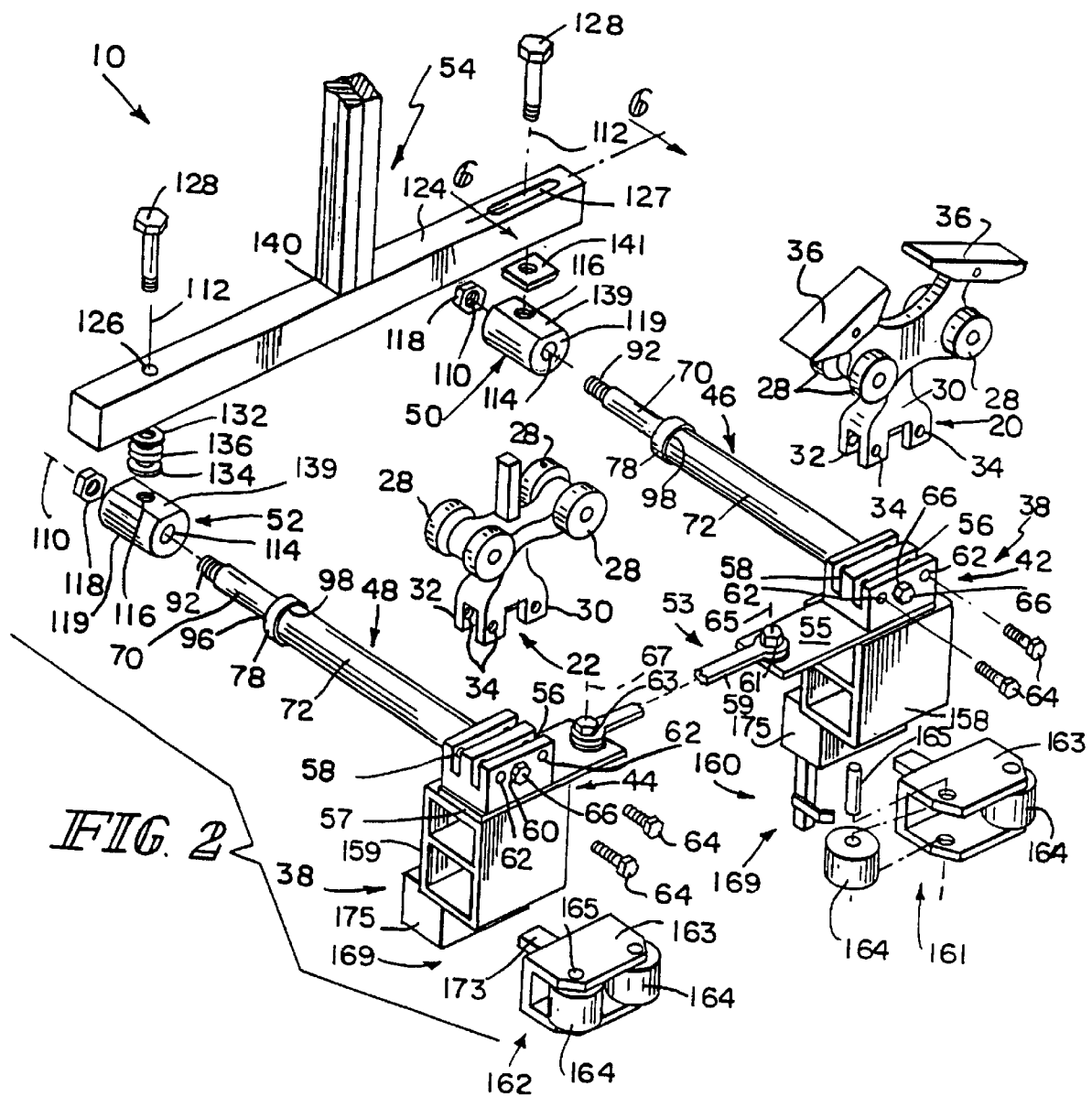
FIG. 2 illustrates a exploded perspective view of several components of the connecting bar assembly and trolleys of the conveyor.

Conventional conveyor 12 includes a conveyor chain or power mechanism 16 positioned to lie in a conveyor power track or power mechanism housing 18 and a plurality of trolleys 20, 22 positioned to lie in a trolley track 24 that extends substantially parallel to power track 18 as shown, for example, in FIGS. 1–3. A conveyor chain link 25 extends downwardly through a power slot 26 formed in power track 18 to connect conveyor chain 16 and trolley 20 so that conveyor chain 16 moves trolleys 20, 22 through trolley track 24. In alternative embodiments, other types of power mechanisms such as a cable may be used to move the trolleys instead of a conveyor chain.

Trolleys 20, 22 include rollers 28 which are positioned to lie within trolley track 24 and two spaced-apart downwardly-extending projections 30, 32 as shown, for example, in FIGS. 2 and 3. Each of the downwardly-extending projections 30, 32 is formed to include bolt-receiving apertures 34. Trolley 20 further includes links 36 extending upwardly toward power slot 26 and engaging conveyor chain link 25 to connect trolley 20 and conveyor chain 16. In the illustrated embodiment of the present invention, only trolley 20 is connected to conveyor chain 16. In alternative embodiments of the present invention, both trolleys may include links that extend upwardly toward the power slot so that both trolleys are connected to the conveyor chain.

Conveyor chain link 25 and trolley 20 can be referred to as linkage 27 that extends through power slot 26 and connects power mechanism 16 and connecting bar 10. In alternative embodiments of the present invention, other types of components can form the linkage between the power mechanism and the connecting bar. Conveyor 12 includes a centerline 23 and linkage 27 extends along the centerline 23 as shown in FIG. 3. In alternative embodiments, the power mechanism may extend through the power slot and the linkage extends from the power mechanism to the connecting bar without extending through the power slot.

Load-carrying connecting bar assembly 10 includes a first end 38 connected to conveyor 12 and a second end 40 connected to a product 14 being conveyed by conveyor 12. Connecting bar 10 supports product 14 so that product 14 is offset from centerline 23 of conveyor 12. The connecting bar 10 supports product 14 at a position wherein power mechanism 16 is positioned to lie between power slot 26 formed in power mechanism housing 18 and product 14. First end 38 of load-carrying connecting bar 10 connects to conveyor 12 so that power slot 26 of conveyor 12 opens downwardly away from product 14 being conveyed. Thus, substances and objects such as water, paint, powder, nuts, etc. cannot easily enter and damage conveyor 12. In addition, because product 14 is supported vertically above conveyor 12, oil, grease, and dust from conveyor 12 cannot fall onto product 14.

Load-carrying connecting bar assembly 10 includes first and second weldments, trolley connectors, or linkage connectors 42, 44 connected to trolleys 20, 22, respectively, first and second horizontally-extending bars 46, 48 connected to weldments 42, 44, respectively, two pivot assemblies 50, 52 connected to horizontally-extending bars 46, 48, respectively, and a load-carrying support 54 connected to horizontally-extending bars 46, 48 and pivot assemblies 50, 52. Connecting bar 10 further includes a tie rod 53 coupled to and positioned to extend between first and second weldments 42, 44.

First weldment 42 and first horizontally-extending bar 46 can be referred to as a first arm of connecting bar 10, second weldment 44 and second horizontally-extending bar 48 can be referred to as a second arm of connecting bar 10, and load-carrying support 54 can be referred to as a third arm of connecting bar 10. In alternative embodiments, other types of third arms other than load-carrying support 54 may be used so long as the third arm positions the product being conveyed at a position wherein power mechanism 16 is positioned to lie between power slot 26 formed in power mechanism housing 18 and product 14.

In the illustrated embodiment, two arms are connected to two trolleys 20, 22. In alternative embodiments of the present invention, depending on the size and weight of the product being conveyed, any number of arms may be coupled to trolleys. The size and shaped of the load-carrying support that connects to these arms would be modified accordingly.

Weldments 42, 44 are each formed to include two spaced-apart trolleyreceiving slots 56, 58 configured to receive downwardly-extending projections 30, 32 of trolleys 20, 22, a connecting bar-receiving aperture 60, and bolt-receiving apertures 62. Bolt-receiving apertures 62 are aligned with bolt-receiving apertures 34 formed in trolleys 20, 22 so that bolts 64 may extend through bolt-receiving apertures 34, 62 to connect weldment 42 to trolley 20 and weldment 44 to trolley 22.

Horizontally-extending bars 46, 48 each include a hollow tube 72, a rod 70 connected to pivot assembly 50, 52 and positioned to lie in hollow tube 72, and a collar 78 positioned to lie around rod 70 and abut hollow tube 70 as shown, for example, in FIGS. 2, 3, 5, and 7. Collar 78 is fixed to rod 70 by a setscrew (not shown).

Rod 70 includes a first end 90 positioned to abut weldment 42, 44 and a second end 92 connected to pivot assembly 50, 52. First end 90 is formed to include a bolt-receiving aperture 86. Bolts 66 extend through connecting bar-receiving apertures 60 formed in weldments 42, 44 and into bolt-receiving apertures 86 formed in rods 70 to connect horizontally-extending bar 46 to weldment 42 and horizontally-extending bar 48 to weldment 44 as shown in FIGS. 2 and 7.

Figure 7:
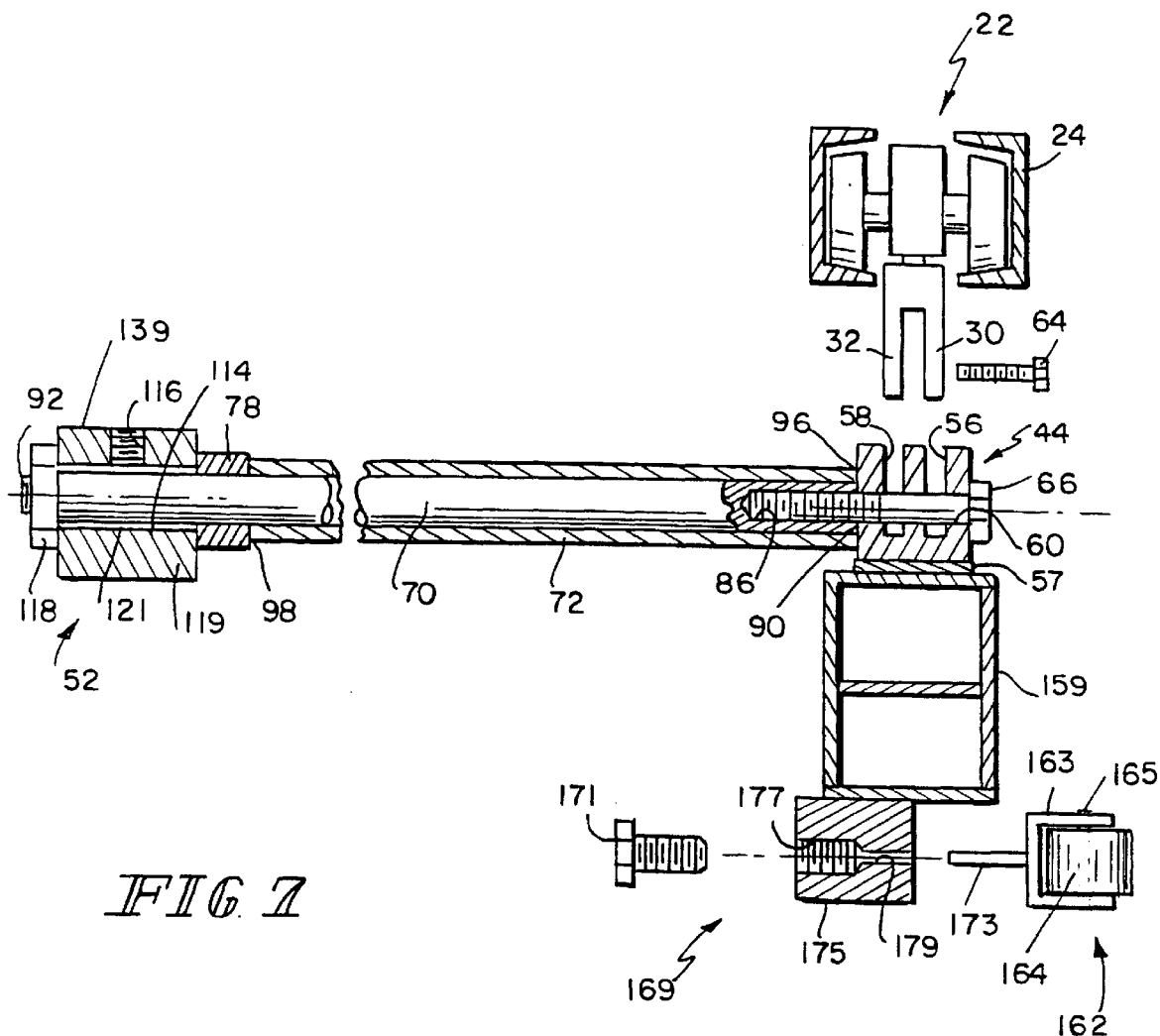
FIG. 7 illustrates an exploded, fragmentary, side elevational view of a portion of the connecting bar assembly.

Hollow tube 72 includes a first end 96 connected to weldment 42, 44 and a second end 98 abutting collar 78 as shown, for example, in FIG. 7. In the illustrated embodiment, first end 96 of hollow tube 72 is welded to weldment 42, 44. However, in alternative embodiments, hollow tube 72 may be connected to weldment 42, 44 in any manner.

Figure 5:
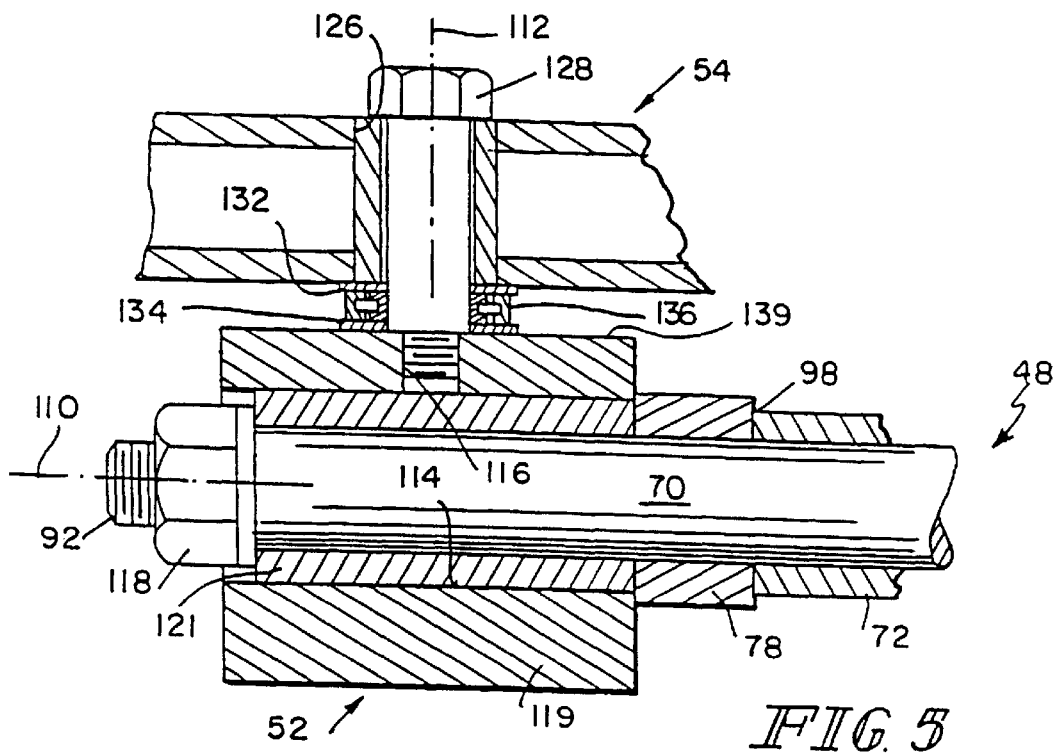
FIG. 5 illustrates a fragmentary, sectional view of the apparatus illustrated in FIG. 4 taken generally along section lines 5—5 of FIG. 4.

Each pivot assembly 50, 52 includes a pivot barrel body 119 that is formed to include a horizontally-extending rod-receiving aperture 114 and a shoulder bolt-receiving aperture 116. Rod 70 of horizontally-extending bar 46, 48 extends through horizontally-extending rod-receiving aperture 114 formed in pivot assembly 50, 52 so that pivot assembly 50, 52 abuts collar 78 of horizontally-extending bar 46, 48 as shown in FIG. 5. Second end 92 of rod 70 is threaded and a nut 118 threads onto threaded second end 92 of rod 70 to connect pivot assembly 50 to horizontally-extending bar 46 and pivot assembly 52 to horizontally-extending bar 48.

Each pivot assembly 50, 52 includes a bushing 121 positioned to lie in horizontally-extending rod-receiving aperture 114 between pivot barrel body 119 and rod 70. Bushing 121 permits load-carrying support 54 to rotate about axes 110 as shown in FIGS. 1, 2, and 5. In preferred embodiments, bushing 121 is a pressed-in bronze bushing.

Figure 5A:
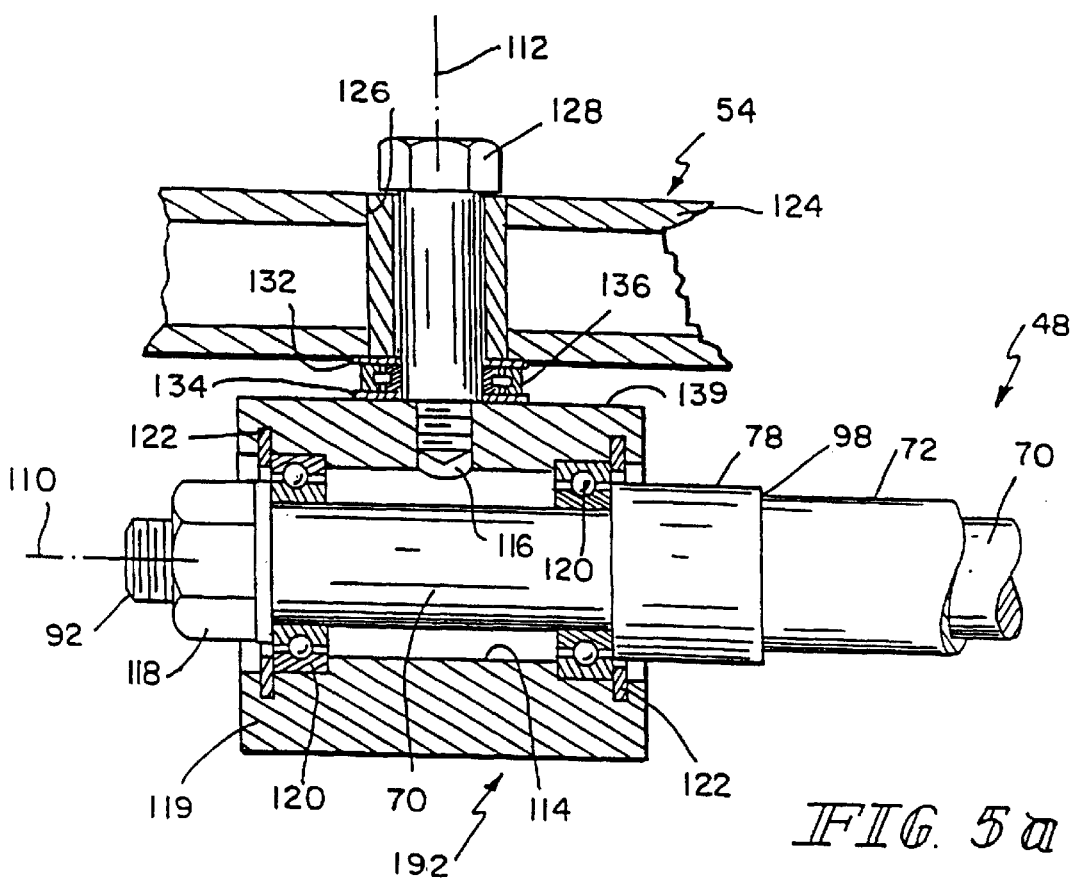
FIG. 5a illustrates a fragmentary, sectional view similar to FIG. 5 showing an alternative embodiment.

In an alternative embodiment, connecting bar 10 includes pivot assemblies 192 that are identical to pivot assemblies 50, 52 except that pivot assemblies 192 include ball bearings 120 positioned to lie around rod 70 of horizontally-extending bar 46, 48 and snap rings 122 to hold ball bearings 120 in place of bushing 121 as shown in FIG. 5a. Ball bearings 120 permit load-carrying support 54 to rotate about axes 110.

Load-carrying support 54 includes a horizontally-extending portion 124 extending between pivot assembly 50 and pivot assembly 52 as shown, for example, in FIG. 1. Horizontally-extending portion 124 is formed to include shoulder bolt-receiving apertures 126, 127 aligned with shoulder bolt-receiving apertures 116 formed in pivot assembly 50, 52. Shoulder bolts or pivot members 128 extend through shoulder bolt-receiving apertures 116, 126, 127 to connect load-carrying support 54 and pivot assemblies 50, 52.

A cylindrical bushing 130 is positioned to lie in shoulder bolt-receiving aperture 126 between shoulder bolt 128 and load-carrying support 54 as shown, for example, in FIGS. 4 and 5. An upper thrust washer 132, lower thrust washer 134, and needle bearing 136 are positioned to lie between horizontally-extending portion 124 of load-carrying support 54 and pivot assembly 52 as shown, for example, in FIGS. 2, 4, and 5. Upper thrust washer 132 engages horizontally-extending portion 124 of load-carrying support 54 and lower thrust washer 134 engages a flat upper surface 139 of pivot barrel body 119 of pivot assembly 52. Needle bearing 136 is positioned to lie between upper and lower thrust washers 132, 134. In preferred embodiments of the present invention, thrust bearings 132, 134 are conventional thrust bearings produced by Torrington Co. of Conn.

Shoulder bolt-receiving aperture 127 can also be referred to as a shoulder bolt-receiving slot 127. A shoulder bolt 128 extends through and is permitted to move in direction 176 through shoulder bolt-receiving slot 127 as shown in FIG. 6. A bushing 178 is positioned to lie in shoulder bolt-receiving slot 127 as shown in FIG. 6. A wear plate 141 is positioned to lie between a flat upper surface 139 of pivot barrel body 119 of pivot assembly 50 and load-carrying support 54. In alternative embodiments, needle bearing 136 and thrust washers 132, 134 are positioned to lie between a flat upper surface 139 of pivot barrel body 119 of pivot assembly 50 and load-carrying support 54 as shown in FIG. 8. In alternative embodiments, the load-carrying support is formed to include two apertures the size and shape of shoulder bolt-receiving aperture 126 and no apertures the size and shape of shoulder bolt-receiving aperture 127 to receive shoulder bolts.

Shoulder bolts 128 are used to connect load-carrying support 54 and pivot assemblies 50, 52 because when shoulder bolts 128 are threaded into shoulder bolt-receiving apertures 116 formed in pivot assemblies 50, 52, no load is placed on upper and lower thrust washers 132, 134 or needle bearings 136. The weight of load-carrying support 54 places a load on upper and lower thrust washers 132, 134 and needle bearings 136, but the threaded engagement of shoulder bolts 128 and pivot assemblies 50, 52 does not increase the load on upper and lower thrust washers 132, 134 and needle bearings 136.

Load-carrying support 54 further includes an upright vertically-extending portion 138 having a first end 140 connected to horizontally-extending portion 124 and a second end 142 connected to product 14. Vertically-extending portion 138 includes a U-shaped portion 144 as shown in FIG. 1. Second end 142 of load-carrying support 54 includes spaced-apart pivot pins 146, (other not shown) connected to product 14.

In alternative embodiments of the present invention, the upright vertically-extending portion may be of any shape required to support a product in a desired position. Also in alternative embodiments of the present invention, multiple upright vertically-extending portions may be connected to a single horizontally-extending portion if required to properly support a product in a desired position.

Tie rod 53 includes first and second plates 55, 57 coupled to weldments 42, 44, respectively, and a bar 59 having a first end 61 pivotally coupled to first plate 55 and a second end 63 pivotally coupled to second plate 57 as shown in FIG. 2. The pivotable connection between bar 59 and first and second plates 55, 57 permit bar 59 and weldments 42, 44 to rotate about axes 65, 67 relative to each other. Tie rod 53 also permits weldment 42 to directly drive weldment 44. This is particularly important in the illustrated embodiment where only trolley 20 is driven by power mechanism 16.

The trolleys 20, 22 and product 14 being conveyed are permitted to negotiate curves because of the connection between load-carrying support 54 and pivot assemblies 50, 52 and tie bar 53. The connection between load-carrying support 54 and pivot assemblies 50, 52 permits load-carrying support 54 to rotate about axes 112 and tie bar 53 permits weldments 42, 44 to rotate about axes 65, 67 so that trolleys 20, 22 can negotiate curves. The pivot assemblies 50, 52 and the connection between load-carrying support 54 and pivot assemblies 50, 52 (i.e. shoulder bolts 128, washers 132, 134, bearing 136, wear plate 141) can be referred to as couplers.

Figure 9:
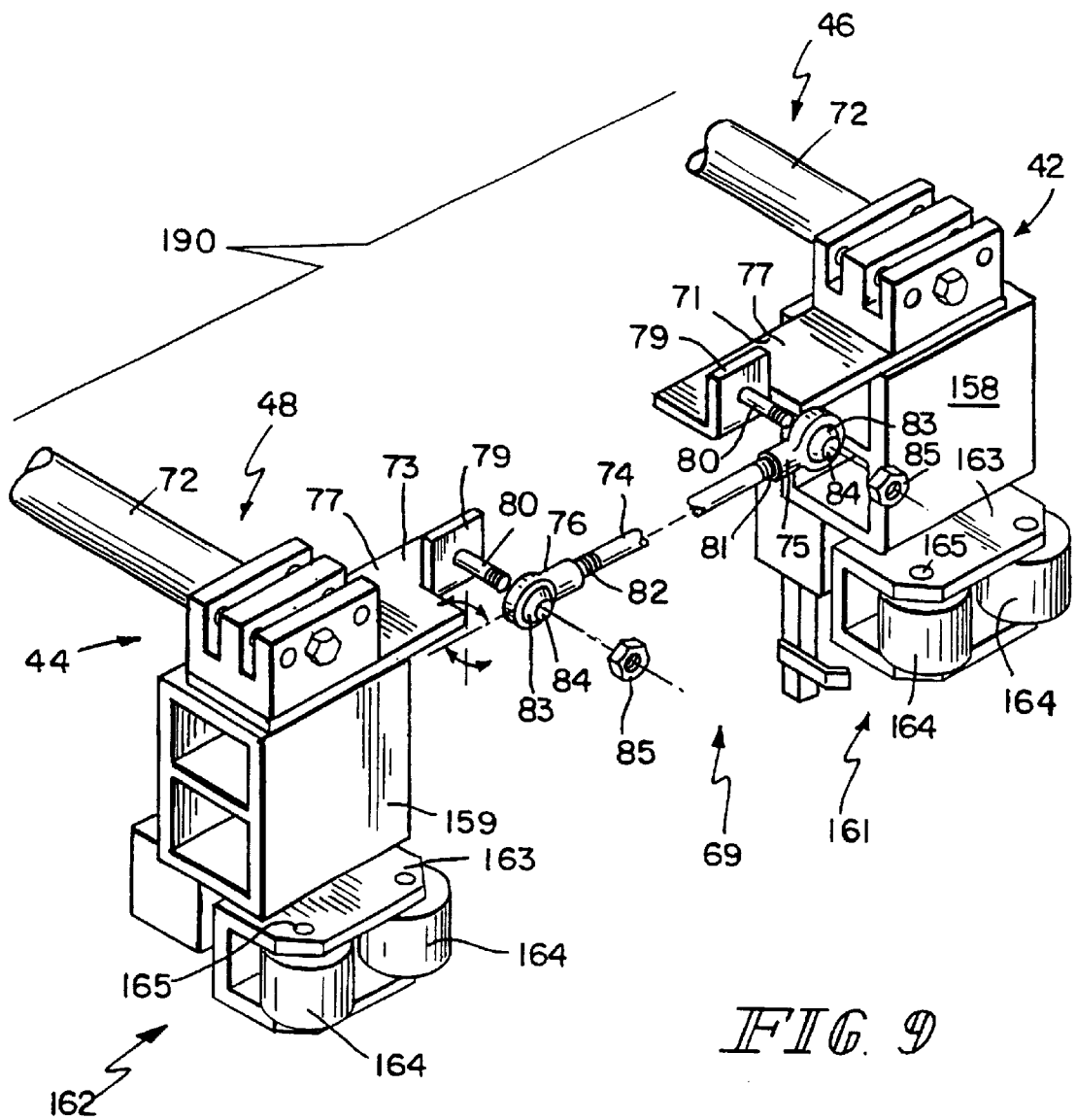
FIG. 9 illustrates a perspective view of a portion of another preferred embodiment of a connecting bar assembly.

If trolleys 20, 22 and product 14 being conveyed need to negotiate elevation changes in addition to curves, tie rod 53 is replaced with a tie rod 69 because tie rod 53 does not permit any elevational difference between trolleys 20, 22. Tie rod 69 is shown in FIG. 9 and includes first and second plates 71, 73 coupled to weldments 42, 44, respectively, a rod 74, and first and second rod end bearings 75, 76. First and second plates 71, 73 include a horizontally-extending portion 77 connected to weldment 42, 44, a vertically-extending tab 79, and a horizontally-extending threaded post 80 connected to tab 79. Rod 74 includes first and second ends 81, 82 and rod end bearings 75, 76 are formed to include threaded apertures (not shown) to receive first and second ends 81, 82, respectively. The distance between rod end bearings 75, 76 can be adjusted via the threaded connection between rod 74 and rod end bearings 75, 76.

Rod end bearings 75, 76 include a spherical-shaped member 83 that is formed to include a post-receiving aperture 84. Posts 80 of first and second plates 71, 73 extend through post-receiving apertures 84 and locknuts 85 thread onto posts 80 to secure rod 74 and rod end bearings 75, 76 to plates 71, 73.

The connection between posts 80 and spherical-shaped members 83 permit trolleys 20, 22 to move translationally relative to each other so that trolleys 20, 22 and connecting bar 10 can negotiate elevation changes and curves. In addition, pivot assemblies 50, 52 permit load-carrying support 54 to rotate about axes 110 so that trolley 20 can be situated at a different elevation than trolley 22.

Conveyor 12 is supported by a plurality of L-shaped supports 150 mounted on a floor 152 as shown in FIG. 3. Conveyor power track 18 and trolley track 24 are connected to a support bracket 154 and support bracket 154 is connected to L-shaped supports 150 as shown in FIGS. 1 and 3. L-shaped supports 150 include a conventional leveling pad 156 to compensate for non-level floors 152.

Load-carrying connecting bar assembly 10 further includes a stabilizing assembly 160 to stabilize product 14 as shown, for example, in FIGS. 2 and 7. Stabilizing assembly 160 includes two spacers 158, 159 connected to first and second plates 55, 57, respectively, and roller assemblies or slide assemblies 161, 162 coupled to spacers 158, 159, respectively. Conveyor 12 further includes a load-stabilizing plate 166 as shown in FIGS. 1–3. Roller assemblies 161,162 include a roller housing or slide housing 163 attached to spacer 158, 159, two rollers or slide members 164 positioned to lie in housing 163, pins 165 coupling rollers 164 to roller housing 163, and a roller position adjuster or slide position adjuster 169. Load-stabilizing plate 166 is connected to L-shaped supports 150 and extends substantially parallel to conveyor power track 18 as shown in FIG. 1.

Rollers 164 engage load-stabilizing plate 166 to support and stabilize product 14 attached to load-carrying support 54. Rollers 164 roll about pins 165 along load-stabilizing plate 166 as trolleys 20, 22 move through trolley track 24. In alternative embodiments of the present invention, the rollers may be replaced with any type of mechanism that engages the load-stabilizing plate and maintains contact with the load-stabilizing plate as the power mechanism moves the trolleys and connecting bar.

The roller position adjuster 169 includes an adjustment device 171, an extension 173 coupled to roller housing 163, and an adjuster block 175 that is formed to include an adjustment device-receiving aperture 177 and an extension-receiving aperture 179 that communicates with adjustment device-receiving aperture 177. The extension 173 slides into extension-receiving aperture 179 and is held within aperture 179 by the contact between roller 164 and load-stabilizing plate 166 as shown in FIG. 3. Until adjustment device 171 is threaded into adjustment device-receiving aperture 177, extension 173 protrudes into extension-receiving aperture 179 until roller housing 163 abuts adjuster block 175. Adjustment device 171 is threaded into adjustment device-receiving aperture 177 and contacts extension 173. The position of adjuster blocks 175 and the rest of connecting bar 10 relative to rollers 161 is adjusted by how far adjustment devices 171 are threaded into adjustment device-receiving apertures 177 to move extensions 173 and thus rollers 161.

In alternative embodiments, the slide assembly includes a separate housing for each roller and the roller position adjuster includes separate adjustment devices and extensions coupled to the separate housings so that each roller is adjusted individually.

In preferred embodiments of the present invention, a shroud 180 is positioned to cover conveyor 12 and portions of load-carrying connecting bar assembly 10 as shown in FIGS. 1 and 3. Shroud 180 reduces the likelihood that any material or substances enter conveyor 12 and interfere with conveyor chain 16. A shroud slot 182 is formed in shroud 180 through which horizontally-extending bars 46, 48 extend as shown in FIGS. 1 and 3. Two rubber strips 184, 186 are connected to shroud 180 and extend into shroud slot 182 to further reduce the likelihood that any material or substances enter conveyor 12.

Figure 10:
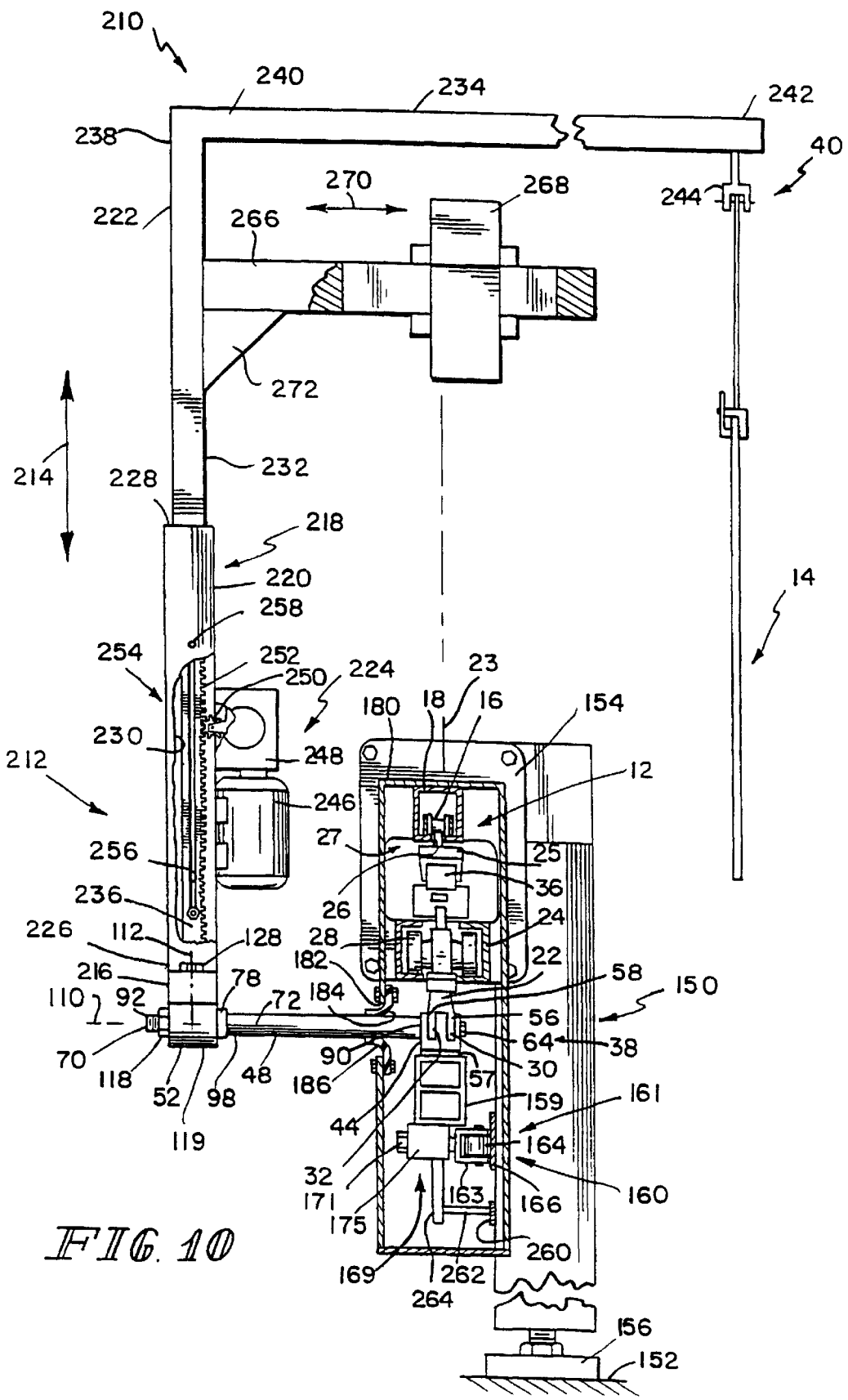
FIG. 10 illustrates a fragmentary, partly sectional end elevational view similar to FIG. 3 of another preferred embodiment of a connecting bar assembly.
Figure 11:
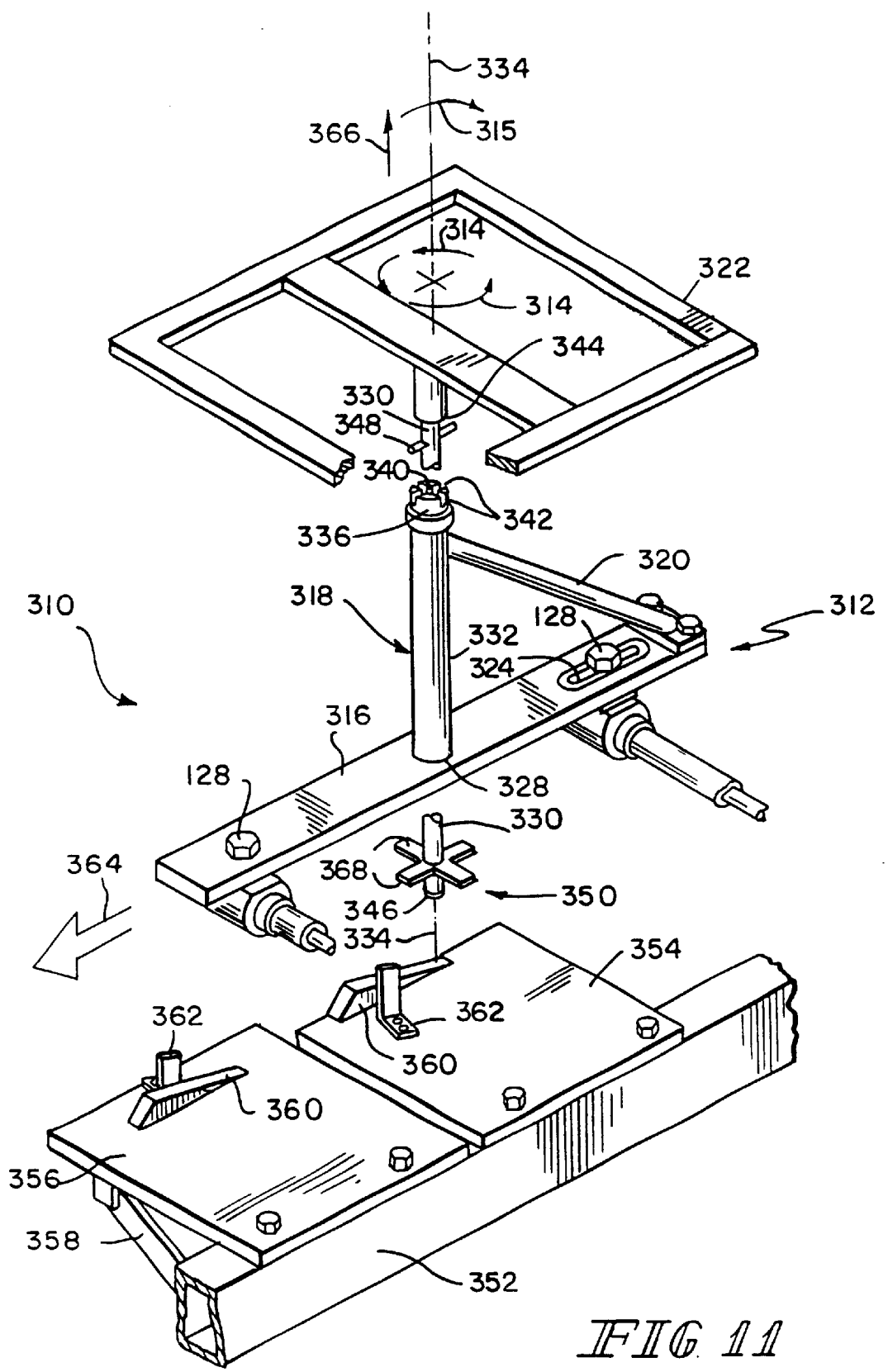
FIG. 11 illustrates an exploded perspective view of yet another preferred embodiment of a connecting bar assembly.

Another load-carrying connecting bar assembly 210 according to a preferred embodiment of the present invention is shown in FIG. 10. Load-carrying connecting bar assembly 210 includes a load-carrying support 212 that can be raised and lowered vertically in direction 214 as shown in FIG. 10. All components of load-carrying connecting bar assembly 210 are identical to components of load-carrying connecting bar assembly 10 except that load-carrying support 54 of connecting bar 10 is different than load-carrying support 212 of connecting bar 210.

Load-carrying support 212 includes a horizontally-extending portion 216 identical to horizontally-extending portion 124 of load-carrying support 54 and a vertically-extending support assembly 218 connected to horizontally-extending portion 216. Vertically-extending support assembly 218 includes first and second vertically-extending shafts 220, 222 and a lifting mechanism 224 that moves second vertically-extending shaft 222 relative to first vertically-extending shaft 220 in vertical direction 214. First vertically-extending shaft 220 includes a first end 226 connected to horizontally-extending portion 216, a second end 228 spaced-apart from first end 226, and a shaft-receiving aperture 230 formed in second end 228. Second vertically-extending shaft 222 extends into shaft-receiving aperture 230 formed in first vertically-extending shaft 220.

Second vertically-extending shaft 222 is L-shaped and includes a vertically-extending portion 232 and a horizontally-extending portion 234. Vertically-extending portion 232 includes a lower end 236 and an upper end 238 connected to horizontally-extending portion 234. Horizontally-extending portion 234 includes a first end 240 connected to vertically-extending portion 232 and a second end 242 spaced apart from first end 240. Load-carrying support 212 further includes a product connector 244 connected to second end 242 of horizontally-extending portion 234. Product 14 is connected to product connector 244.

Lifting mechanism 224 includes an electric motor 246 connected to first vertically-extending shaft 220, a gear reducer 248 connected to first vertically-extending shaft 220, and a spur gear 250 driven by electric motor 246 through gear reducer 248. Two pillow block bearings (not shown) are positioned to lie on either side of spur gear 250 to support rotational movement of spur gear 250. Lower end 236 of vertically-extending portion 232 of second vertically-extending shaft 222 is formed to include a rack 252 engaging spur gear 250. Rotation of spur gear 250 moves rack 252 to move second vertically-extending shaft 222 relative to first vertically-extending shaft 220 in vertical direction 214.

Movement of second vertically-extending shaft 222 relative to first vertically-extending shaft 220 is limited by a pin and slot arrangement 254. In the illustrated embodiment of the present invention, lower end 236 of vertically-extending portion 232 of second vertically-extending shaft 222 is formed to include a slot 256 and a pin 258 is fixed to first vertically-extending shaft 220. Pin 258 extends into slot 256 and is arranged to limit upward movement of second vertically-extending shaft 222 relative to first vertically-extending shaft 220. In alternative embodiments of the present invention, the slot may be formed in the first vertically-extending shaft and the pin connected to the second vertically-extending shaft. Electrical power is provided to electrical motor 246 in a conventional manner by an electrical conductor 260, collector shoe 262, and tow strap bracket 264.

Load-carrying support 212 further includes a counterbalance arm 266 connected to vertically-extending portion 232 of second vertically-extending shaft 222 and a counterbalance weight 268 positioned to lie on counterbalance arm 266. Counterbalance weight 268 may be moved along counterbalance arm 266 in direction 270. The position of counterbalance weight 268 on counterbalance arm 266 is selected to optimize the stability of product 14 being conveyed. A web 272 extends between second vertically-extending shaft 222 and counterbalance arm 266 to provide additional structural support for counterbalance arm 266.

Another load-carrying connecting bar assembly 310 according to a preferred embodiment of the present invention is shown in FIGS. 11–15. All components of load-carrying connecting bar assembly 310 are identical to components of load-carrying connecting bar assemblies 10, 210 except that load-carrying supports 54, 212 of connecting bars 10, 210, respectively, are different than load-carrying support 312 of connecting bar 310. Load-carrying support 312 permits a product 14 being conveyed to be rotated in directions 314, 315 to a desired position.

Load-carrying support 312 includes a horizontally-extending portion 316, a vertically-extending portion 318, a support brace 320 extending between horizontally-extending portion 316 and vertically-extending portion 318, and a product support member 322. Horizontally-extending portion 316 is formed to include shoulder bolt-receiving apertures 326 to receive shoulder bolts 128 and establish a pivoting relationship between load-carrying support 312 and horizontally-extending bars 46, 48 as in connecting bars 10, 210. Horizontally-extending portion 316 is also formed to include an aperture 328 through which vertically-extending portion 318 extends.

Vertically-extending portion 318 includes an inner rod 330 and an outer sleeve 332 as shown in FIGS. 11-15. Inner rod 330 is movable axially along axis 334 relative to outer sleeve 332 and horizontally-extending portion 316 so that product 14 positioned to lie on product support member 322 may be rotated in direction 314 or 315 about axis 334.

Outer sleeve 332 is connected to horizontally-extending portion 316 and includes a top side 336, a bottom side 338, and a rod-receiving aperture 340 that extends from top side 336 to bottom side 338. The top side 336 of outer sleeve 332 is formed to include four spaced-apart slots 342. Inner rod 330 is positioned to lie in rod-receiving aperture 340 and includes a top side 344 coupled to product support member 322, a bottom side 346, a pin 348, and a support rotation index 350.

Conveyor 12 further includes a conveyor frame 352, first and second plates 354, 356 coupled to conveyor frame 352, plate supports 358 extending between and coupling conveyor frame 352 and plates 354, 356, ramps 360 coupled to plates 354, 356, and fixed members 362 coupled to plates 354, 356. The ramps 360 and fixed members 362 interact with inner rod 330 to rotate product support member 322 in direction 314 about axis 334. A shown in FIG. 12, when bottom side 346 of inner rod 330 is spaced-apart from ramps 360, pin 348 of inner rod 330 is positioned to lie in two of slots 342 so that inner rod 330 and product support member 322 are prevented from rotating about axis 334 relative to outer sleeve 332.

As conveyor 12 moves product 12 in direction 364, bottom side 346 of inner rod 330 engages ramp 360 so that inner rod 330 moves upwardly in direction 366 along axis 334 so that pin 360 disengages slots 342 of outer sleeve 332 to permit inner rod 330 and product support member 322 to rotate about axis 334 as shown in FIG. 13. As conveyor 12 continues to move load-carrying support arm 312 in direction 364, support rotation index 350 of inner rod 330 engages fixed member 362 to rotate inner rod 330 and product support member 322 in direction 314 about axis 334 a predetermined amount from the position shown in solid lines in FIG. 13 to the position shown in phantom lines in FIG. 13. Once the bottom side 346 of inner rod 330 disengages ramp 360, pin 348 is positioned to lie in two of slots 342 to prevent inner rod 330 and product support member 322 from rotating relative to outer sleeve 332 as shown in FIG. 14.

In the illustrated embodiment, index support member 350 includes four spaced-apart arms 368 that are properly sized so that inner rod 330 will rotate 90° each time support rotation index 350 engages fixed member 362. In alternative embodiments of the present invention, the support rotation index may include any number and size of arms to achieve the desired amount of rotation of the inner rod and product support member relative to the outer sleeve. In the illustrated embodiment, two ramps 360 are positioned to lie in close proximity to each other as shown in FIG. 14 to show how inner rod 330 and product support member 322 can be rotated 180° in one direction in two 90° steps.

Figure 15:
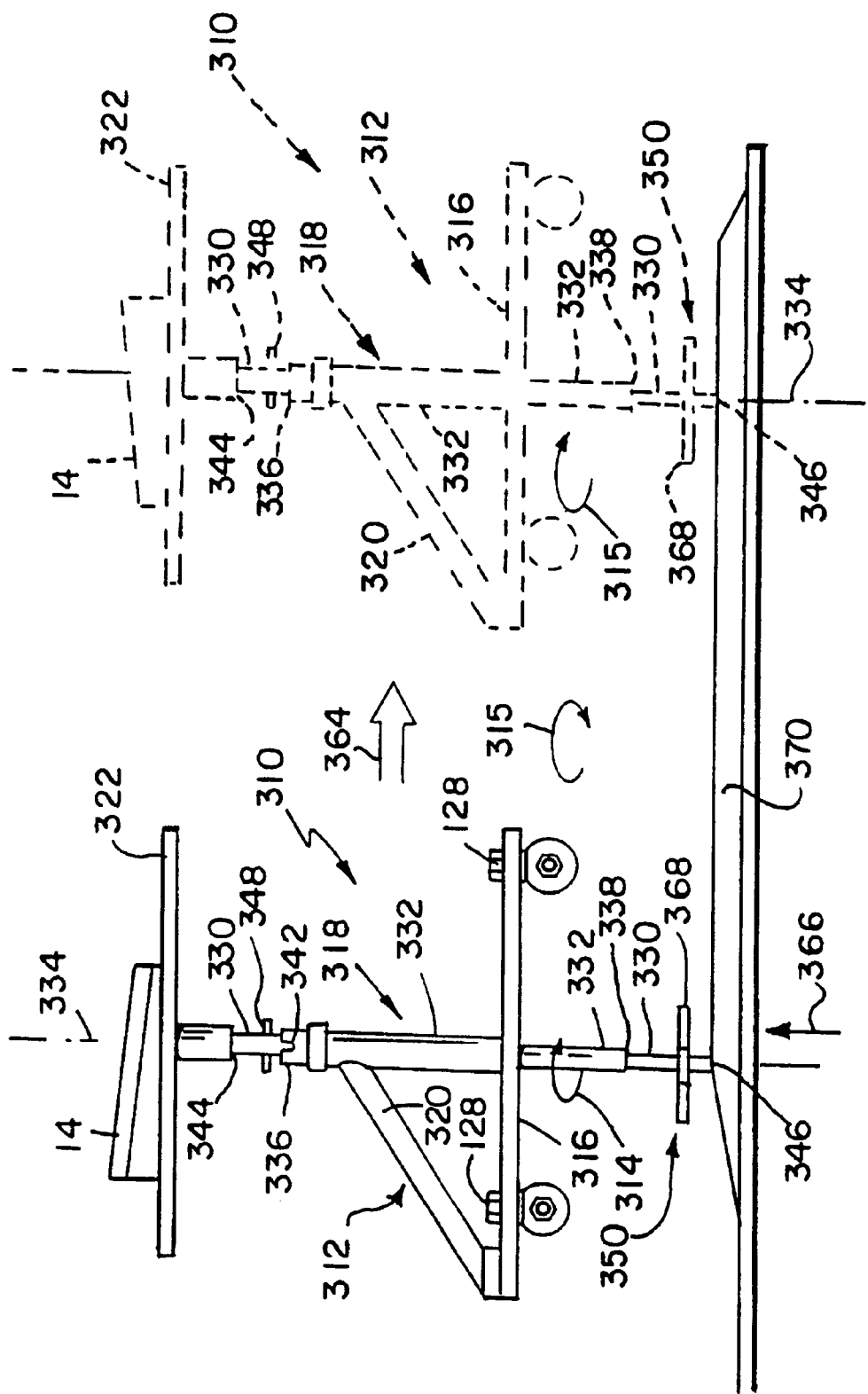
FIG. 15 illustrates a side elevational view of the connecting bar assembly of FIG. 11 showing the connecting bar assembly engaging a large ramp and the position of the product before it is rotated (solid lines) and the position of the product after it is rotated (phantom lines).

As shown in FIG. 15, a lift 370 that is longer than ramp 360 may be used so that a worker performing work on product 14 may freely rotate inner rod 330 and product support member 322 to any desired position. When the worker is finished with product 14, conveyor 12 moves product 14 in direction 364 off of lift 370 so that pin 348 once again is positioned to lie in slots 342 of outer sleeve 332 to prevent rotation of product support member 322.

Although this invention has been described in detail with reference to certain embodiments, variations and modifications exist within the scope and spirit of the invention as described and as defined in the following claims.

What is claimed is:

1. A conveyor comprising
a power mechanism housing formed to include a power slot,
a power mechanism positioned to lie in the power mechanism housing,
a linkage having a first end coupled to the power mechanism and a second end spaced apart from the first end, one of the linkage and power mechanism being positioned to extend through the power slot, and
a connecting bar coupled to the second end of the linkage and configured to support a product at a position wherein the power mechanism is positioned to lie between the power slot formed in the power mechanism housing and the product.

2. The conveyor of claim 1, wherein the conveyor further includes a second linkage and the connecting bar includes a first arm having a first end coupled to the linkage and a second end spaced-apart from the first end, a second arm coupled to the second linkage, and a third arm having a first end coupled to the first and second arms and a second end spaced apart from the first end.

3. The conveyor of claim 2, wherein the connecting bar further includes a first coupler positioned to lie between the first arm and second arm and a second coupler positioned to lie between the third arm and second arm to permit the first, second, and third arms to move relative to each other.

4. The conveyor of claim 3, wherein the first coupler permits the third arm to rotate relative to the first arm about a single axis of rotation.

5. The conveyor of claim 3, wherein the first coupler permits the third arm to rotate relative to the first arm about a multiple axes of rotation.

6. The conveyor of claim 3, wherein the connecting bar further includes a tie rod connected to and extending between the first and second arms, the tie rod including a first member coupled to the first arm, a second member coupled to the second arm, and a third member pivotably coupled to the first and second arms.

7. The conveyor of claim 6, wherein the third arm is pivotable relative to the first arm about a single axis.

8. The conveyor of claim 6, wherein the third arm is pivotable relative to the first arm about multiple axes.

9. The conveyor of claim 1, wherein the connecting bar includes an arm coupled to the second end of the linkage and a stabilizing mechanism coupled to the arm.

10. The conveyor of claim 9, wherein the conveyor includes a load-stabilizing plate positioned to extend parallel to the power mechanism and the stabilizing mechanism includes a slide assembly configured to engage and slide along the load-stabilizing plate.

11. A connecting bar assembly for use with a conveyor, the connecting bar assembly comprising a first arm coupled to the conveyor, a second arm spaced apart from the first arm and coupled to the conveyor, a third arm coupled to the first and second arms and configured to support a product conveyed by the conveyor, and first and second couplers, the first coupler being positioned to lie between the first arm and third arm and the second coupler being positioned to lie between the second arm and third arm so that the first, second, and third arms can move relative to each other.

12. The connecting bar assembly of claim 11, wherein the first coupler is a pivot barrel that permits rotation of the third arm relative to the first arm along an axis extending through the first arm.

13. The connecting bar assembly of claim 12, wherein the second coupler is a pivot barrel that permits rotation of the third arm relative to the second arm along an axis extending through the second arm.

14. The connecting bar assembly of claim 11, wherein the third arm is formed to include an aperture and the first coupler includes a pivot member having a first end extending through the aperture formed in the third arm and a second end coupled to the first arm.

15. The connecting bar assembly of claim 14, wherein the first coupler further includes a needle bearing positioned to lie between the first and third arms and the pivot member extends through the needle bearing.

16. The connecting bar assembly of claim 15, wherein the first coupler further includes a pivot barrel pivotably coupled to the first arm and coupled to the second end of the pivot member to permit the third arm to rotate about an axis extending through the first arm.

17. The connecting bar assembly of claim 11, wherein the third arm is formed to include a slot and the second coupler includes a pivot member having a first end extending through the slot to establish a pivotable and slidable connection between the pivot member and third arm and a second end coupled to the second arm.

18. The connecting bar assembly of claim 17, wherein the second coupler further includes a wear plate positioned to lie between the second and third arms, the wear plate is formed to include an aperture, and the pivot member extends through the aperture formed in the wear plate.

19. A conveyor comprising a power mechanism, a load-stabilizing plate positioned to extend substantially parallel to the power mechanism, and a connecting bar assembly including an arm coupled to the conveyor and a load-stabilizing assembly including a slide assembly coupled to the arm and configured to engage and slide along the load-stabilizing plate.

20. The connecting bar assembly of claim 19, wherein the load-stabilizing assembly further includes a spacer positioned to lie between the arm and the slide assembly.

21. The connecting bar assembly of claim 19, wherein the slide assembly includes a slide housing coupled to the arm and a slide member coupled to the slide housing and the slide is positioned to engage and slide along the load-stabilizing plate.

22. The connecting bar assembly of claim 21, wherein the slide assembly includes a second slide member pivotably coupled to the slide housing and positioned to engage and slide along the load-stabilizing plate.

23. The connecting bar assembly of claim 19, wherein the load-stabilizing assembly further includes a slide position adjuster coupled to the arm.

24. The connecting bar assembly of claim 23, wherein the slide position adjuster includes an adjuster block formed to include an extension-receiving aperture and an adjustment device-receiving aperture in communication with the extension-receiving aperture, an extension coupled to the slide housing and positioned to lie in the extension-receiving aperture, and an adjustment device positioned to lie in the adjustment device-receiving aperture to engage the extension, the adjustment device being movable to adjust the position of the slide member relative to the arm.

25. The connecting bar assembly of claim 23, wherein the slide position adjuster includes an adjustment device coupled to the arm and the adjustment device is movable to change the position of the slide assembly relative to the arm.

26. A conveyor having a centerline, the conveyor comprising a power mechanism housing formed to include a power slot, a power mechanism positioned to lie in the power mechanism housing, a linkage having a first end coupled to the power mechanism and a second end spaced apart from the first end, one of the linkage and power mechanism being positioned to extend through the power slot, and the linkage extending along the centerline of the conveyor, and a connecting bar coupled to the second end of the linkage and configured to support a product in a position wherein the product is offset from the centerline of the conveyor.

* * * * *